United States Patent
Tidd

(10) Patent No.: US 8,922,569 B1
(45) Date of Patent: *Dec. 30, 2014

(54) CLOUD BASED SYSTEM FOR AND METHOD OF TRANSLATING BETWEEN DISPARATE 3D GRAPHICS LANGUAGES IN CLIENT-SERVER COMPUTING ENVIRONMENTS

(75) Inventor: William Tidd, Alton Bay, NH (US)

(73) Assignee: hopTo Inc., Campbell, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/399,806

(22) Filed: Feb. 17, 2012

Related U.S. Application Data

(63) Continuation-in-part of application No. 13/341,179, filed on Dec. 30, 2011.

(51) Int. Cl.
*G06T 1/00* (2006.01)

(52) U.S. Cl.
USPC ............ 345/522; 345/505; 709/203; 719/315

(58) Field of Classification Search
None
See application file for complete search history.

(56) References Cited

U.S. PATENT DOCUMENTS

| | | | |
|---|---|---|---|
| 5,831,609 A * | 11/1998 | London et al. ................. | 715/746 |
| 6,578,197 B1 | 6/2003 | Peercy et al. | |
| 6,747,642 B1 | 6/2004 | Yasumoto | |
| 8,171,154 B2 * | 5/2012 | Vonog et al. ................... | 709/232 |
| 2008/0033940 A1 * | 2/2008 | Dinh et al. ........................ | 707/6 |
| 2008/0201705 A1 | 8/2008 | Wookey | |
| 2008/0316218 A1 | 12/2008 | Kilani et al. | |
| 2009/0089453 A1 * | 4/2009 | Bohan et al. ................... | 709/246 |
| 2009/0189894 A1 | 7/2009 | Petrov et al. | |
| 2010/0070951 A1 | 3/2010 | Yamin | |
| 2010/0118039 A1 * | 5/2010 | Labour ......................... | 345/522 |
| 2010/0328326 A1 | 12/2010 | Hervas et al. | |
| 2011/0035758 A1 * | 2/2011 | Stoyanov et al. ............. | 719/324 |
| 2011/0055823 A1 | 3/2011 | Nichols et al. | |
| 2011/0153824 A1 * | 6/2011 | Chikando et al. ............. | 709/226 |
| 2012/0011193 A1 | 1/2012 | Gilboa | |
| 2012/0254453 A1 * | 10/2012 | Lejeune et al. ............... | 709/230 |
| 2012/0328326 A1 | 12/2012 | Sato | |
| 2012/0331532 A1 * | 12/2012 | Walters et al. .................... | 726/5 |
| 2013/0124953 A1 | 5/2013 | Fan et al. | |

OTHER PUBLICATIONS

U.S. Appl. No. 13/341,110, Office Action mailed Dec. 11, 2013.
U.S. Appl. No. 13/399,793, Office Action mailed Oct. 1, 2013.
U.S. Appl. No. 13/341,179, Office Action mailed Oct. 29, 2013.
U.S. Appl. No. 13/341,198, Office Action mailed Dec. 5, 2013.
U.S. Appl. No. 13/399,852, Office Action mailed Oct. 21, 2013.
U.S. Appl. No. 13/399,793, Final Office Action mailed May 12, 2014.

(Continued)

*Primary Examiner* — Ulka Chauhan
*Assistant Examiner* — Patrick F Valdez
(74) *Attorney, Agent, or Firm* — Lewis Roca Rothgerber LLP

(57) ABSTRACT

A client-server computing system includes a server with a virtual display driver that marshals and transmits graphics application programming interface (API) functions to a client via a network. The virtual display driver includes a translation module that classifies graphics commands according to graphics library type and, if necessary, translates commands from one type to another such that the original command can be executed on the client. The translation module enables the server and the client to utilize different types of graphics libraries, such as the Direct3D API and the OpenGL API.

17 Claims, 3 Drawing Sheets

(56) References Cited

OTHER PUBLICATIONS

U.S. Appl. No. 13/341,179, Final Office Action mailed Jun. 16, 2014.
U.S. Appl. No. 13/341,198, Final Office Action mailed Jun. 11, 2014.
U.S. Appl. No. 13/399,852, Final Office Action mailed May 27, 2014.

* cited by examiner

US 8,922,569 B1

CLOUD BASED SYSTEM FOR AND METHOD OF TRANSLATING BETWEEN DISPARATE 3D GRAPHICS LANGUAGES IN CLIENT-SERVER COMPUTING ENVIRONMENTS

RELATED APPLICATIONS

This application is a continuation-in-part of U.S. patent application Ser. No. 13/341,179, filed Dec. 30, 2011, the entirety of which is incorporated by reference herein.

TECHNICAL FIELD

The present disclosure relates generally to client-server computing systems, and more particularly to a system for and method of translating between disparate 3D graphics languages in client-server computing environment.

BACKGROUND

In a client-server computing system, a computer application or program that is running on one computer (i.e., the server) may be accessible to another computer (i.e., the client) over a network, such as over the Internet. The user interface running on the server is exposed and visible to the client. In this way, the client has remote access to the server and the user of the client device can interact with the application that is running on the server.

The server application may be, for example, an application that processes two-dimensional (2D) and/or three-dimensional (3D) graphics. In this example, a 2D and/or 3D graphics application may be used to render graphical objects on a computer display. Currently, in a client-server computing system, the high-level graphics representation (e.g., Direct3D, OpenGL) is reduced to an image (e.g., a bitmap image) at the server. The image is then transmitted from the server to the client over the network. Once received at the client, the image is rendered on the client display. Creating, compressing, and transmitting these image files may result in high CPU utilization (i.e., computing load) at the server, especially when the application displays objects in motion and when there are a large number of remote users sharing the server. Further, images are often large and, therefore, transmitting images to a large number of remote users consumes a large amount of network bandwidth.

While previous client-server computing systems have addressed the aforementioned problems by directing graphics commands (instead of images) to clients requesting remote access to 3D graphics applications on a server, such systems have generally assumed that server and client 3D graphics libraries may differ in only platform-specific extensions or library version (e.g., OpenGL 1.4 v. OpenGL 1.2).

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a client-server computing system that enables cross-platform remote access to 3D graphics applications and methods of efficiently displaying graphic objects on a computer (client) located remotely from a computer (server) that is running the 3D graphics application. The client-server computing system of the disclosure exhibits numerous advantages over existing systems. In various embodiments, the client-server computing system of the disclosure and associated methods enable a server that includes a first type of 3D graphics library (such as Direct3D) to provide 3D graphics application capabilities to clients that include a second type of 3D graphics library (such as OpenGL). This allows clients and servers the freedom to implement an appropriate 3D graphics library for each device without sacrificing compatibility.

Figure 1:
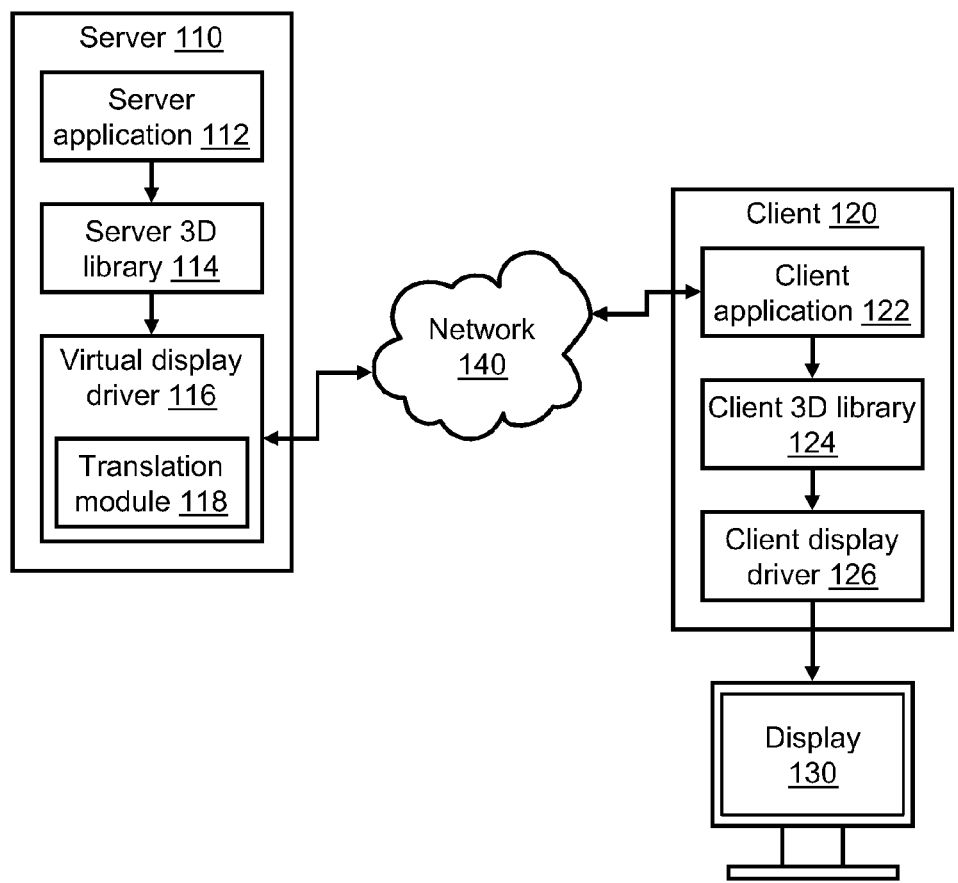
FIG. 1 illustrates a block diagram of a client-server computing system for providing cross-platform remote access to 3D graphics applications, according to the present disclosure.

FIG. 1 illustrates a block diagram of a client-server computing system 100 for providing cross-platform remote access to 3D graphics applications. Client-server computing system 100 includes a server 110 that is operatively connected to a client 120 and a display 130 via a network 140. Network 140 may be, for example, a local area network (LAN) and/or a wide area network (WAN) for connecting to the Internet. Entities of client-server computing system 100 may connect to network 140 by any wired and/or wireless means.

While client 120 and display 130 are illustrated as separate physical components (e.g., illustrative of a common implementation of a desktop or a workstation computing system such as clients running natively on Windows, Linux, UNIX, and Mac OS X operating system), the capabilities of such separate components can also be integrated in a single device (e.g., a mobile device or a tablet computer). For example, the mobile device can be an iPad tablet computer on the iOS operating system (Apple Inc., Cupertino, Calif.), or other mobile client on either the Android operating system (Google Inc., Mountain View, Calif.) or the Windows CE operating system (Microsoft Corp., Redmond, Wash.). Thus, as used herein, the terms "client" or "client computer" should be understood to include any such implementations.

Server 110 includes a server application 112, a server 3D library 114, and a virtual display driver 116 that, in accordance with the client-server model of computing, collectively function to enable server 110 to provide various resources or services to client 120, which may be located remotely from the server. In accordance with the present disclosure, these resources or services pertain to computer graphics.

Client 120 includes a client application 122, a client 3D library 124, and a client display driver 126. Collectively, these elements function to enable the client and the client user to consume computer graphics resources or services provided by server 110.

Server application 112 represents an application executing (i.e., "running") on server 110. The functionality of server application 112 shall be visible to and accessible by client 120 via network 140. For example, server application 112 may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application such as Symbia.net (Siemens AG, Munich, Germany); an interactive mapping application such as Google Earth (Google, Inc.); or a 3D game. The functionality of server application 112 shall be visible to and accessible by client 120 via network 140. For example, the functionality of server application 112 may be accessed from client 120 using a process herein known as application publishing, which is currently supported by products such as GraphOn GO-Global, Microsoft Remote Desktop Services, and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems", which is incorporated by reference as though fully set forth herein.

Client application 122 represents an application installed on and executing on client 120 that emulates a user interface of server application 112. For example, the client application may run in a browser and be implemented in a scripting language such as JavaScript, a multimedia platform such as Adobe Flash, or as a browser add-on (e.g., ActiveX control for Internet Explorer). Additionally, client application 122 may run as a standalone application. Client application 122 may receive various input commands from the user via an input device (not shown in FIG. 1), then transmit these commands to server 110, and update the user interface of client application 122 in response to computer graphics commands transmitted from server 110 back to client 120 over network 140.

Server 3D library 114 and client 3D library 124 provide a set of common interfaces or graphics functions to server 110 and client 120, respectively. These components are also referred to herein as a high-level graphics language or a graphics application programming interface (API). Server 110 and client 120 utilize different types of libraries. For example, server 110 may include the Direct3D graphics API (Microsoft Corp., Redmond, Wash.), while client 120 may include the OpenGL graphics API (Khronos Group, Beaverton, Oreg.). Various embodiments of this disclosure are directed towards enabling graphics commands from one library type to be realized using equivalent graphics commands from another library type. This is advantageous as it does not force server 110 and client 120 to adhere to a single common library, rather it lets each entity implement the most appropriate library for the device.

Virtual display driver 116 is a software code module that enables commands or functions that are called in server 3D library 114 to be marshaled (i.e., encoded) and transmitted to client 120 over network 140. Marshaling (or marshalling) is the process of transforming the memory representation of such commands to a data format suitable for transmission via network 140. Virtual display driver 116 includes a translation module 118 that, prior to marshaling, classifies graphics commands according to graphics library type and, if necessary, translates commands from one type to another such that the original command can be executed on client 120. For example, translation module 118 may convert a Direct3D graphics command into one or more OpenGL graphics command(s), the latter of which may be transferred to client 120 for execution.

Client display driver 126 includes a software code module that receives marshaled data from server 110 via client application 122 and executes the 3D library functions using client 3D library 124. This enables client 120 to handle intensive graphics rendering operations, such as blending or shading, while enabling server 110 to share server application 112 with a large pool of clients. This also reduces the bandwidth requirements of network 140 as pixel array image data (e.g., in the form of Bitmap image files) no longer needs to be transmitted from server 110 to individual clients, such as client 120, as was the case in conventional client-server computing systems.

Figure 2:
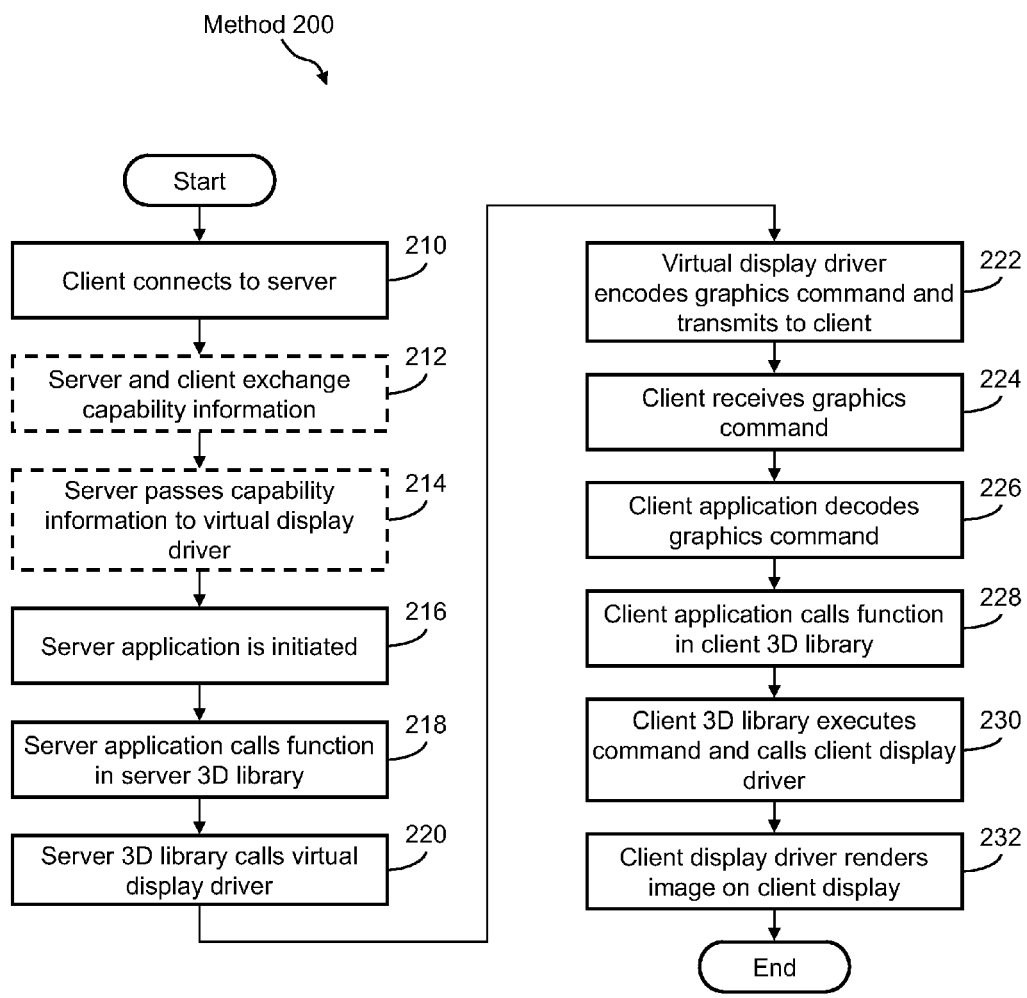
FIG. 2 illustrates a flow diagram of a method of displaying graphic objects on a client using client-server computing system, according to the present disclosure.

FIG. 2 illustrates a flow diagram of an example of a method 200 of displaying graphic objects on a client using client-server computing system 100 of the disclosure. Method 200 may include, but is not limited to, the following steps.

At a step 210, client 120 connects to server 110 via network 140 by a suitable connection of either conventional or novel design. For example, the connection may be established in accordance with a Transmission Control Protocol/Internet Protocol (TCP/IP) model as is known to one of skill.

At an optional step 212, server 110 and client 120 may exchange capability information (i.e., negotiate protocols), which may be of use in later steps of method 200 in which virtual display driver 116 encodes commands from server 3D library 114. For example, the capability information transmitted from client 120 to server 110 may include information about the particular APIs (e.g., OpenGL windowing APIs) supported by client display driver 126. The capability information may include the version or versions of client 3D library 124 (e.g., OpenGL 3.2) that are available on client 120. The capability information may also include any extensions available on client 120. This information may be transmitted in any format that is supported by the client/server system.

At an optional step 214, server 110 may forward the capability information from the server component that is in direct network communication with client 120 to virtual display driver 116. Virtual display driver 116 then stores the information in a memory so that the information can be quickly accessed. This enables virtual display driver 116 to maintain (e.g., expand, update) a central repository of capability information of all client devices. It also enables virtual display driver 116 to quickly lookup the capability of a particular client 120 at resource or service request time.

At a step 216, client 120 initializes server application 112 on server 110 via network 140. In the example of server application 112 being an AutoCAD application, this step may include, for example, server 110 carrying out various startup instructions of the AutoCAD application. These startup instructions generally include loading and initializing server 3D library 114. When it is initialized, or at an earlier or later time, server 3D library 114 may query virtual display driver 116 to determine its capabilities. Virtual display driver 116 may report that it supports a graphics command that is not supported by client 120 if virtual display driver 116 or other software on server 110 can convert the command that client 120 does not support into one or more commands that client 120 does support.

At a step 218, server application 112 calls or invokes the appropriate function or functions (i.e., "graphics commands") in server 3D library 114 in response to a request of client 120. For example, if client 120 issues a request to draw a 3D cube, a call is made to server 3D library 114 to satisfy the "draw 3D cube" request.

At a step 220, server 3D library 114 receives a call made by server application 112 at step 318. Server 3D library 114 then executes the function by making one or more calls to the virtual display driver 116. Unlike conventional client-server computing systems, server 3D library 114 does not generally execute the graphics commands and produce a bitmap image.

Figure 3:
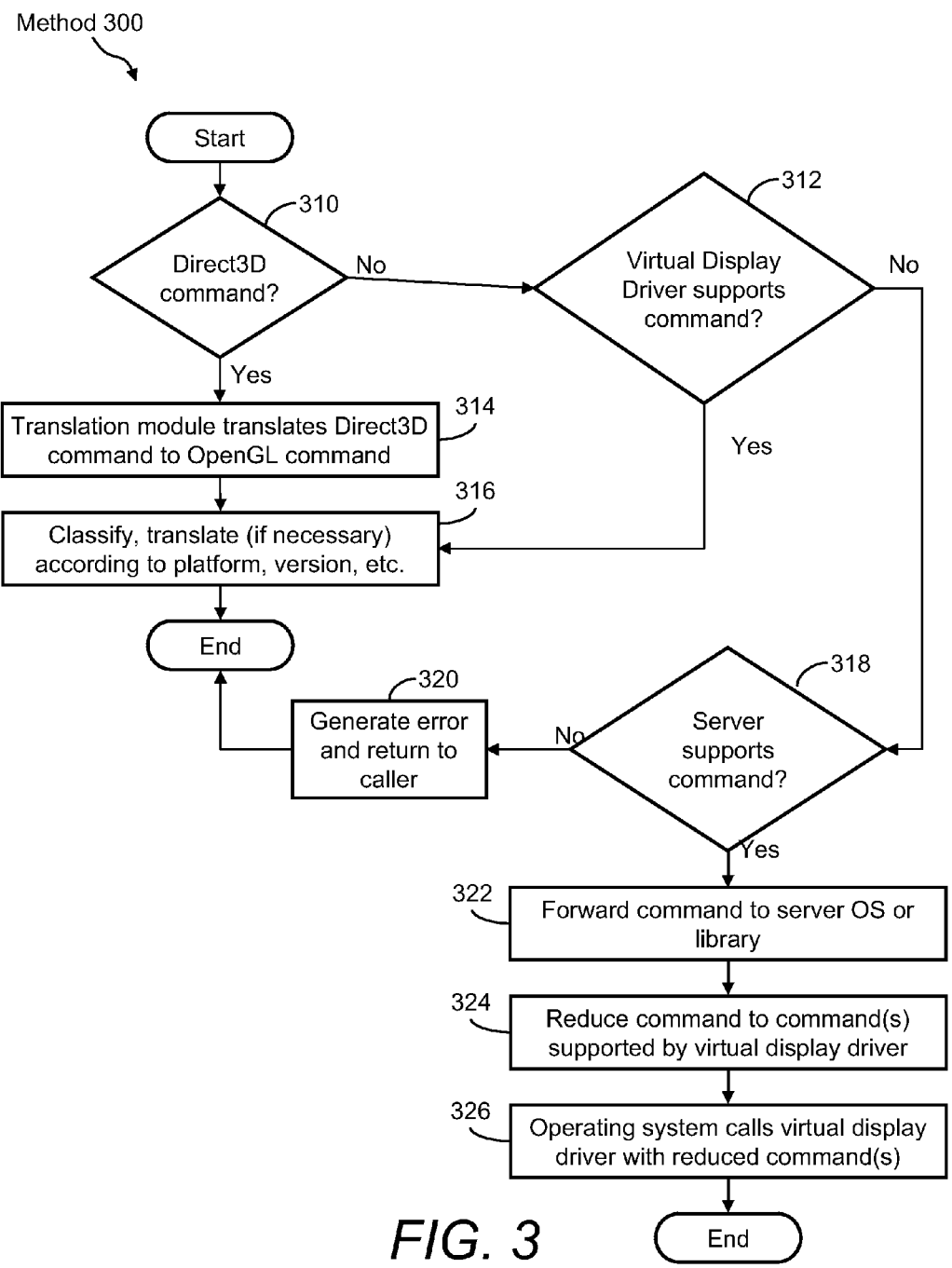
FIG. 3 illustrates a flow diagram of a method of translating between different 3D graphics languages in client-server computing systems, according to the present disclosure.

At a step 222, virtual display driver 116 encodes each of the received graphics calls and transmits the information to client 120 via network 140. As described in client-server computing system 100, because client 120 utilizes a different type of library than the library from which the received graphics call originated, encoding includes calling upon translation module 118 to classify and, if necessary, translate the commands to an equivalent command (or set of commands) that can be realized by client 120. Ultimately, the information transmitted to client 120 may not be the received graphics calls, but a translation providing equivalent functionality that can be achieved through execution by client 120. FIG. 3 describes an example of a method of translating between different 3D graphics languages that may be performed by translation module 118 as part of step 222.

At a step 224, the client component that is in direct network communication with server 110 receives the transmission from virtual display driver 116. The client component then forwards the transmission to client application 122.

At a step 226, client application 122 decodes the graphics commands. This step may include, for example, reading (e.g., parsing) function names and function parameters from the server transmission into a format compatible with client 3D library 114. One of skill will recognize that specific details of decoding by client 120 may depend on the details of encoding employed by server 110 at step 222.

At a step 228, client application 122 optionally performs additional preprocessing and formatting of the function and its parameters (for example, additional platform-specific or version-specific formatting) and then calls or invokes client 3D library 114 with the decoded function names and parameters that satisfy the request of client 120.

At a step 230, client 3D library 124 executes each of the graphic commands and calls client display driver 126 with the resulting pixel image array data. The actual implementation of each graphic command that is executed on client 120 (e.g., define a surface with a given texture, wrap surface around a sphere) is specific to the client's computing platform. For example, if client 120 is operating on a Windows platform, the execution of the graphics commands is, for example, a Windows OpenGL implementation. Calls to client 3D library 124 differs from conventional client-server computing systems wherein the client is making calls to a 2D library only because the bitmap image (or other form of image array data) has already been generated on the server and supplied to the client by the server.

At a step 232, client display driver 126 renders an image to display 130. For example, this step may include setting pixel image array data in a memory of the client display driver 120, which defines the image displayed on the computer's monitor or other form of display.

FIG. 3 illustrates a flow diagram of an example of a method 300 of translating between different 3D graphics languages. Method 300 may be performed by translation module 118 as part of step 222 of method 200 of FIG. 2. Method 300 may include, but is not limited to, the following steps.

At a decision step 310, virtual display driver 116 determines whether a received graphics command is a Direct3D command. If the graphics command is received in a function of virtual display driver 116 that supports only Direct3D commands, the determination is implicit. Alternatively, if the graphics command is received in a function of virtual display driver 116 that supports both Direct3D commands and non-Direct3D commands, the determination may be made by accessing data structures that maintain attributes of specific graphics commands (e.g. a lookup table), or it may be made implicitly in code that is specific to the command. If the call is not a Direct3D command, method 300 proceeds to a step 312. However, if the command is a Direct3D command, method 300 proceeds to a step 314.

At a decision step 312, having determined that the received graphics call is not a Direct3D command at decision step 310, translation module 118 determines whether virtual display driver 116 supports the received graphics command. This may be determined by accessing data structures that maintain attributes of specific graphics commands (e.g. a lookup table), or it may be determined implicitly in code that is specific to a given graphics command. If the command is supported by virtual display driver 116, method 300 proceeds to a step 316. However, if the call is not supported by virtual display driver 116, method 300 proceeds to a step 318.

At a step 314, having determined that the received graphics call is a Direct3D command at decision step 310, translation module 118 performs a translation of the command to an equivalent OpenGL command or set of OpenGL commands. This assumes that client 3D library 124 is of the OpenGL type. If client 3D library is of another type, the translation of the command will be to this type instead. The type of client 3D library 124 may be available to translation module 118 if included as part of client capability information sent to virtual display driver 116 at step 214 of method 200 of FIG. 2.

In the case of a Direct3D to OpenGL translation, translation module 118 may first identify whether there is a single OpenGL equivalent command to the Direct3D command. In this case, translation module 118 may convert the Direct3D command to the OpenGL equivalent. For example, D3dContextCreate may be converted to wglCreateContext. If there exists no single equivalent OpenGL command, translation module 118 may then identify whether the Direct3D command can be represented as a set of OpenGL equivalent commands. In this case, translation module 118 may convert the Direct3D command to a set of OpenGL equivalent commands. For example, D3dContextDelete may be implemented using wglMakeCurrent (to ensure the context to be deleted is not current) and wglDeleteContext. If there exists no set of equivalent OpenGL commands, translation module 118 may default back to a screen scraping method, in which the graphics command is converted to a bitmap image by either virtual display driver 116, server 3D library 114 or some other graphics library on the server.

If translation module 118 can identify an equivalent OpenGL command or set of OpenGL commands, translation module 118 may then proceed to classify the commands according to library type specific criteria, such as whether the commands are specific to a particular operating system or API version. Translation module 118 may also perform translation based on the classification. Additional library type specific classification and translation that may be performed at this step can be found in Graphon Corporation ipDisclosure GOJO-1004, entitled "SYSTEM FOR AND METHOD OF CLASSIFYING AND TRANSLATING GRAPHICS COMMANDS IN CLIENT-SERVER COMPUTING SYSTEMS."

At a step 316, having determined that the received graphics call is supported by virtual display driver 116 at decision step 312, translation module 118 may then proceed to classify the commands according to library type specific criteria as introduced and referenced herein above.

At a decision step 318, having determined that virtual display driver 116 does not support the received graphics command, virtual display driver 116 determines whether the operating system or some other graphics library on the server can convert the command to a command or set of commands that virtual display driver 116 does support. This may be determined by accessing data structures that maintain attributes of specific graphics commands (e.g. a lookup table), or it may be determined implicitly in code that is specific to a given graphics command. If neither the operating system nor any other graphics library on the server supports the command, method 300 proceeds to a step 320. However, if server 110 supports the command, method 300 proceeds to a step 322.

At a step 320, having determined that neither the server's operating system nor any other graphics library on the server can convert the command to commands that virtual display driver 116 supports at decision step 318, virtual display driver 116 generates an error that gets returned to server 3D library 114. Generally virtual display driver 116 prevents this case from occurring by properly reporting to server 3D library 114 the capabilities that it supports. In the event, however, that server 3D library calls a function that virtual display driver 116 does not support, server 3D library 114 may throw the error back to the server application 112 and eventually, to client application 122. The error signifies that the command is not supported by the API library or operating system. If method 300 reaches this step, both method 200 of FIG. 2 and method 300 terminate; that is, execution of the function or functions called at step 218 of method 200 of FIG. 2 cannot be achieved. The caller can be notified.

At a step 322, having determined that a library exists on server 110 that supports the command at decision step 318, the command is then forwarded to said library of server 110.

At a step 324, said graphics library of server 110 reduces the command to a command (or set of commands) that is supported by virtual display driver 116. For example, if server 110 is a Windows computer and the graphics command is DrvBitBlt and a parameter is passed to DrvBitBlt that virtual display driver 116 does not support, virtual display driver 116's implementation of DrvBitBlt may call the server operating system's EngBitBlt function. EngBitBlt may then break the complex command down into one or more simpler DrvBitBlt commands that virtual display driver 116 does support.

At a step 326, the operating system of server 110 then calls virtual display driver 116 with the graphic command(s) that virtual display driver 116 supports. In summary, if method 300 reaches this step, virtual display driver 116 has utilized the operating system or another graphics library on server 110 to perform a graphics command translation prior to virtual display driver 116 transmitting the command to client 120.

Various embodiments of the present disclosure allow for the functionality of this disclosure to be performed by an intermediary device, such as a cloud server (not shown), which may be associated with the server 110 and client 120, or reside elsewhere in the network (e.g., in the cloud). For example, while client 120 is interacting with server 110, some of the methods described herein may be offloaded to the cloud server to be performed. Additionally, the cloud server may be used to facilitate interaction between individual or multiple clients and server 110 by performing protocol and/or graphics conversions as described herein.

The invention claimed is:

1. A server computing system for translating between disparate 3D graphics languages in client-server computing environments, the server computing system comprising:
a server operatively coupled to a cloud server through a network, the server comprising a server application, and functionality for making the server application visible to and accessible by a remote client, wherein the server further:
calls, by the server application, a platform-specific graphics API function;
calls, by the server application, a platform-specific display driver;
communicates the platform-specific graphics API function and display driver to the cloud server, wherein the cloud server:
identifies the graphics API function as platform-specific based on stored data regarding attributes of a plurality of different graphics functions,
determines that no library on the cloud server supports the platform-specific graphics API function, and
forwards the platform-specific graphics API function to the server,
reduces the platform-specific graphics API function at the server, wherein the platform-specific graphics API function is reduced into commands supported by a library of the cloud server;
provides the reduced commands to the cloud server for conversion into an OpenGL command, wherein the cloud server:
converts the platform-specific graphics API function to one or more OpenGL commands; and
sends over the network, the OpenGL command to the remote client, wherein the remote client:
calls the OpenGL command in a 3D library resident in the remote client;
executes the OpenGL command in a 3D library resident in the remote client;
calls a display driver resident in the remote client; and
renders an image using the display driver.

2. The system of claim 1, wherein the remote client comprises a client application for communicating with the server functionality and providing access to the server application.

3. The system of claim 1, wherein the server application is accessible to a plurality of remote clients, and wherein each of the plurality of clients executes graphics commands based on local resources.

4. The system of claim 3, wherein the local resources include a resident client library of graphics functions.

5. The system of claim 3, wherein the remote client communicates information regarding its resident client library to the cloud server.

6. The system of claim 1, wherein the OpenGL command is sent to the remote client in lieu of pixel image data.

7. The system of claim 1, wherein the cloud server identifies that there is no single OpenGL command equivalent to the platform-specific graphics API function, and wherein the conversion includes converting the platform-specific graphics API function into a set of OpenGL commands.

8. The system of claim 1, wherein the cloud server further classifies the one or more OpenGL commands according to library type specific criteria.

9. A method for translating between disparate 3D graphics languages in client-server computing environments, the method comprising:
making a server application visible to and accessible by a remote client;
calling, by the server application, a platform-specific graphics API function;
calling, by the server application, a platform-specific display driver;
communicating platform-specific graphics API function and display driver to a cloud server, wherein the cloud server:
identifies the graphics API function as platform-specific based on stored data regarding attributes of a plurality of different graphics functions,
determines that no library on the cloud server supports the platform-specific graphics API function, and forwards the platform-specific graphics API function to the server;

reducing the platform-specific graphics API function at the server, wherein the platform-specific graphics API function is reduced into commands supported by a library of the cloud server;

providing the reduced commands to the cloud server for conversion into an OpenGL command, wherein the cloud server:

converts the platform-specific graphics API function to one or more OpenGL commands; and sends the OpenGL command to the remote client, wherein the remote client:

calls the OpenGL command in a 3D library resident in the remote client;

executes the OpenGL command in a 3D library resident in the remote client;

calls a display driver resident in the remote client; and renders an image using the display driver.

10. The method of claim 9, wherein the remote client comprises a client application for communicating with the server functionality and providing access to the server application.

11. The method of claim 9, wherein the server application is accessible to a plurality of remote clients, and wherein each of the plurality of clients executes graphics commands based on local resources.

12. The method of claim 11, wherein the local resources include a resident client library of graphics functions.

13. The method of claim 11, wherein the remote client communicates information regarding its resident client library to the cloud server.

14. The method of claim 9, wherein the OpenGL command is sent to the remote client in lieu of pixel image data.

15. The method of claim 9, wherein the cloud server identifies that there is no single OpenGL command equivalent to the platform-specific graphics API function, and wherein the conversion includes converting the platform-specific graphics API function into a set of OpenGL commands.

16. The method of claim 9, wherein the cloud server further classifies the one or more OpenGL commands according to library type specific criteria.

17. A non-transitory computer-readable storage medium, having embodied thereon a program executable by a processor to perform a method for translating between disparate 3D graphics languages in client-server computing environments, the method comprising:

making a server application visible to and accessible by a remote client;

calling, by the server application, a platform-specific graphics API function;

calling, by the server application, a platform-specific display driver;

communicating platform-specific graphics API function and display driver to a cloud server, wherein the cloud server:

identifies the graphics API function as platform-specific based on stored data regarding attributes of a plurality of different graphics functions, determines that no library on the cloud server supports the platform-specific graphics API function, and forwards the platform-specific graphics API function to the server;

reducing the platform-specific graphics API function at the server, wherein the platform-specific graphics API function is reduced into commands supported by a library of the cloud server; and providing the reduced commands to the cloud server for conversion into an OpenGL command, wherein the cloud server:

converts the platform-specific graphics API function to one or more OpenGL commands;

sends the OpenGL command to the remote client, wherein the remote client:

calls the OpenGL command in a 3D library resident in the remote client;

executes the OpenGL command in a 3D library resident in the remote client;

calls a display driver resident in the remote client; and renders an image using the display driver.

* * * * *